March 23, 1926.                                         1,577,693
                      C. B. DALE
                   SHOCK ABSORBER
                  Filed May 5, 1921          3 Sheets-Sheet 1
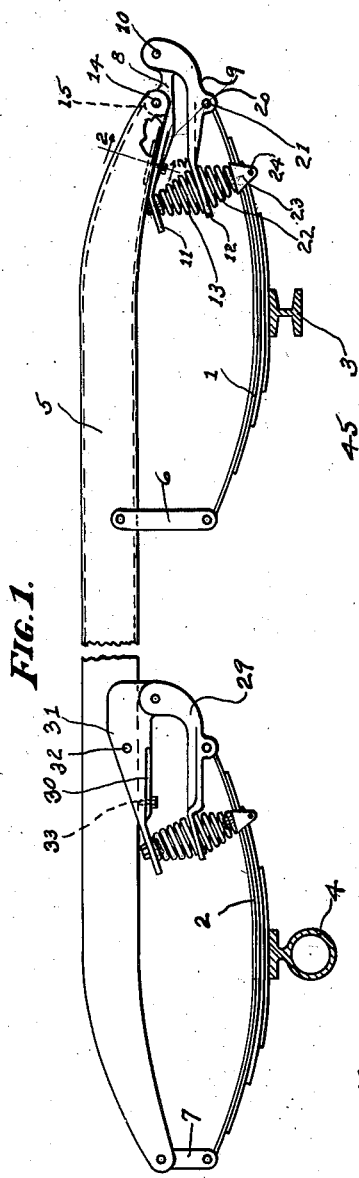
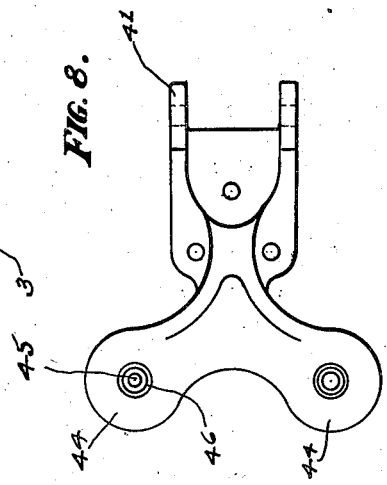
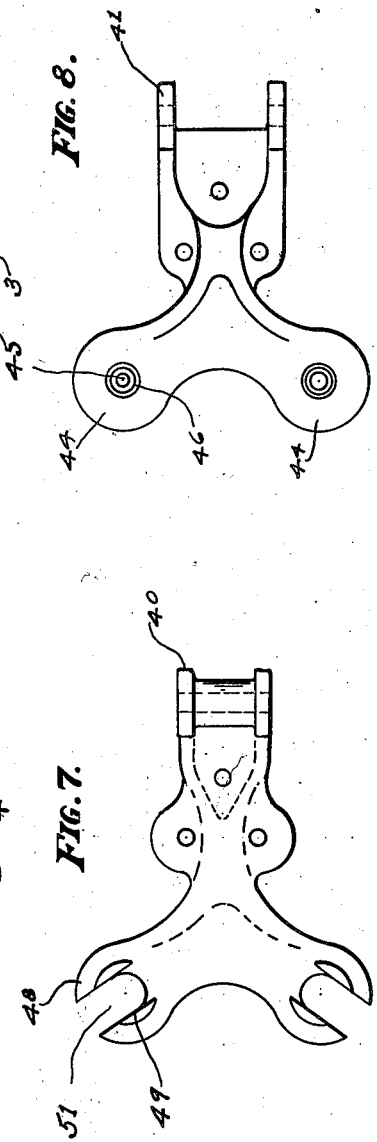
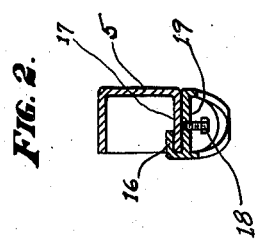
INVENTOR.
Colin B. Dale
BY
Erwin, Wheeler & Woolard
ATTORNEYS.

March 23, 1926.

C. B. DALE

SHOCK ABSORBER

Filed May 5, 1921

Colin B. Dale INVENTOR.

BY Erwin Wheeler & Woolard ATTORNEYS.

March 23, 1926.

C. B. DALE

SHOCK ABSORBER

Filed May 5, 1921

INVENTOR.

Colin B. Dale

BY

Erwin, Wheeler & Wooley

ATTORNEYS.

Patented Mar. 23, 1926.

1,577,693

UNITED STATES PATENT OFFICE.

COLIN B. DALE, OF MILWAUKEE, WISCONSIN.

SHOCK ABSORBER.

Application filed May 5, 1921. Serial No. 467,147.

*To all whom it may concern:*

Be it known that I, COLIN B. DALE, a citizen of the United States, residing at Milwaukee, county of Milwaukee, and State of Wisconsin, have invented new and useful Improvements in Shock Absorbers, of which the following is a specification.

This invention relates to shock absorbers and is particularly directed to the spring type adapted to be interposed at some point between the body of the automobile and the supporting axle.

In shock absorbers, as at present designed, the cushioning of a shock occasioned by the wheels striking an obstruction in the roadway is only in a vertical plane. It is obvious that when the wheels of an automobile are traveling along the roadway at a relatively high speed and encounter an obstruction that there is first a rearward force exerted and thereafter an upward force. The shock absorbers heretofore designed did not take care of this rearward blow but merely cushioned the upwardly directed component of the blow.

The primary objects of this invention are, therefore, to provide a shock absorber which will cushion the rearwardly directed blow in addition to cushioning the upwardly directed blow; and to provide such a shock absorber which will allow a slight rearward and upward motion of the axles with reference to the body portion of the machine.

Further objects of this invention are to provide a shock absorber which will cushion the sudden blows that would otherwise be transmitted to the body portion of the machine before the relatively heavy springs will act; which will transmit a more gradually applied force to the main springs; and which will cushion the rebound of a vehicle and tend to damp out subsequent continued vibrations.

Further objects are to provide a shock absorber which may be applied to the existing types of springs and axles without material modification, which is of simple and sturdy design, and which may be cheaply and readily manufactured.

Further objects are to provide a shock absorber for motor driven vehicles which is so associated with the axles of the vehicle that the propulsive force may be transmitted to the vehicle thru the medium of the shock absorber; to provide a shock absorber which will cushion variations in the propulsive force and will thereby tend to smooth out certain jerks in starting and in stopping; and to provide a shock absorber that will act in dual capacity of both cushioning shocks due to irregularities in the roadway and shocks due to sudden starting and stopping of the machine.

Embodiments of the invention are shown in the accompanying drawings in which:—

Figure 1 is a side elevation showing the shock absorbers applied to the front and rear portions of the running gear of an automobile and showing the relation in which they are placed with regard to the axles, spring and side bar.

Figure 2 is a section on line 2—2 of Figure 1.

Figure 7 is a plan view of the upper member of the shock absorber shown in Figure 5.

Figure 8 is a similar view of the lower member of the shock absorber shown in Figure 5.

Figure 3:
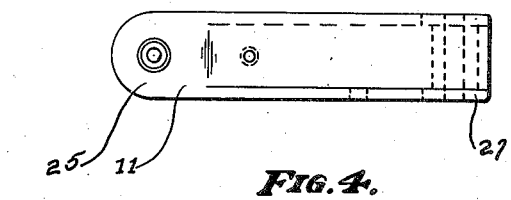
Figure 3 is a plan view of the top member of one of the shock absorbers illustrated in Figure 1.
Figure 4:
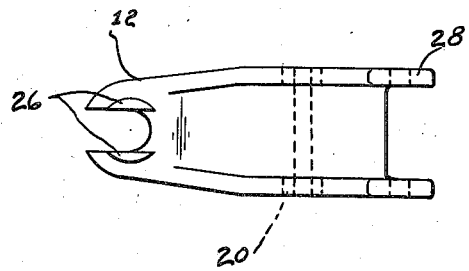
Figure 4 is a similar view of the other or co-operating member of the shock absorber shown in Figure 1.

Figures 1, 2, 3 and 4, showing one form of shock absorber, will first be described. This shock absorber is adapted to be applied to an automobile in which the front and rear springs 1 and 2 are secured to the front and rear axles 3 and 4 respectively, and at their rear ends to the side bar 5 of an automobile by means of links 6 and 7 respectively. These shock absorbers are adapted to be interposed between the front portion of the springs 1 and 2 and to have such springs secured to one member of the shock absorber, the other member being secured to the side bar 5. The shock absorbers shown in Figure 1 are of substantially the same type, being slightly modified so as to co-operate with the respective portions of the side frame bar of the automobile chassis to which they are attached. The front shock absorber comprises an upper member and a lower member 8 and 9 which are pivotally joined by the pintle or pivot pin 10. These members extend rearwardly and have opposing portions 11 and 12 respectively, between which is positioned a conical spring 13. The upper member 8 is secured to the side frame bar 5 by having the shackle bolt 14 passed thru lugs 15 formed integrally with such upper member. This member has an outwardly directed flange portion 16 which is adapted to slip over the bottom flange 17 of the side bar 5, as indicated at Figure 2. A set screw 18 is threaded thru the flat under portion 19 of the member 8 and is adapted to bear against the under side of the bottom flange 17 of the side bar 5 to thereby bind the upper member 18 tightly against such side bar and prevent rattling or any lost motion. The eye of the spring 1 is secured to the lugs 20 of the lower member 9 by means of a bolt or pintle pin 21. A second conical spring 22 is positioned between the member 12 and the spring 1, its lower end resting upon a clip 23 which is secured by means of a bolt 24 to the spring 1. The outer ends of the springs 13 and 22 may be retained in position in any suitable manner as, for example, by means of bolts and caps. The lower portion of the member 11 is provided with a raised boss 25 (Figure 3) and the upper and lower portions of the member 12 are provided with a pair of lugs 26 adapted to be positioned within the respective springs. It is to be noted that the point at which the members 8 and 9 are pivotally joined is materially in advance of and above the front axle 3, such pivotally joined portion may conveniently be formed upon upturned lugs 27 and 28 respectively, one pair fitting between the other pair (Figures 1, 3 and 4).

The rear shock absorber is substantially like the forward one in the form shown in Figure 1, the main difference being the slight difference in shape of the lower and upper members 29 and 30 respectively, at their point of pivotal union. The upper member is also provided with a flange 31 which extends upwardly along the outer face of the side bar 5 and is provided with an opening 32 thru which a suitable clamping bolt is adapted to pass, such bolt also passing thru the opening in the side bar which was initially formed for the pin that secures the eye of the rear spring 2 to such side bar. This bolt securely clamps the rear shock absorber in position, a suitable set screw 33 being provided which functions in the same manner as the set screw 18 of the front shock absorber.

Figure 5:
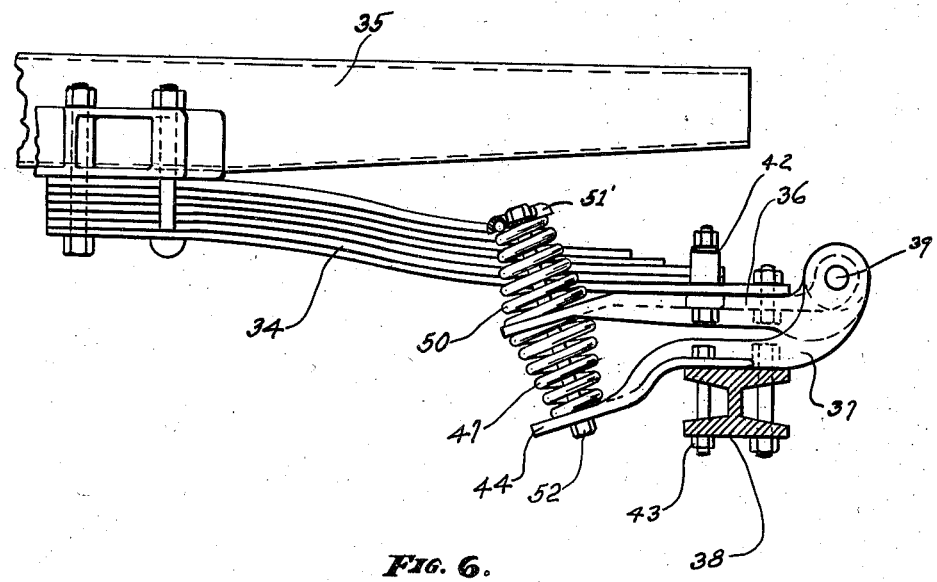
Figure 5 is a fragmentary elevation of the front portion of a further type of automobile equipped with a modified form of shock absorber.

Figures 5, 6, 7 and 8, showing a further form of the invention, will now be described. In this form a shock absorber is shown which is particularly adapted to co-operate with an automobile which is provided with a cantilever spring 34 attached to the side bar 35 of such automobile. The front shock absorber comprises upper and lower members 36 and 37 which are respectively secured to the free end of the cantilever spring 34 and to the front axle 38. These members, as may be seen from Figures 5, 7 and 8, are pivotally joined by means of the bolt or pin 39 which passes thru the co-operating lugs 40 and 41 respectively, provided upon such members. A plurality of bolts 42 and 43 respectively, secure the upper and lower members to the cantilever spring and to the front axle 38. Each of the members is forked. The top member is provided with a pair of bearing plates 44 which extend upon opposite sides of the cantilever spring 34 and are each provided with a central opening 45 which is surrounded by an inwardly projecting boss 46 adapted to seat within the outer convolution of the helical spring 47. The upper member is provided with a pair of bearing portions 48 which are provided with a plurality of bosses 49 whose outer contour corresponds roughly to the inner contour of the helical springs 47 and 50, such bosses, of course, being provided upon both sides of each of the bearing members 48. In order to secure the desired lightness, these bearing plates may be provided with cutout portions 51, as shown in Figure 7. A cup-shaped member 51' caps the upper end of the helical spring 50 and a bolt 52 passes completely thru both springs with the nut and head respectively, positioned upon the outer side of the cap member and of the bearing plate 44.

This construction provides a pair of conical springs upon each side of the cantilever spring 34, the lower spring 47 preferably being of heavier material than the upper or snubbing spring 50.

Figure 6:
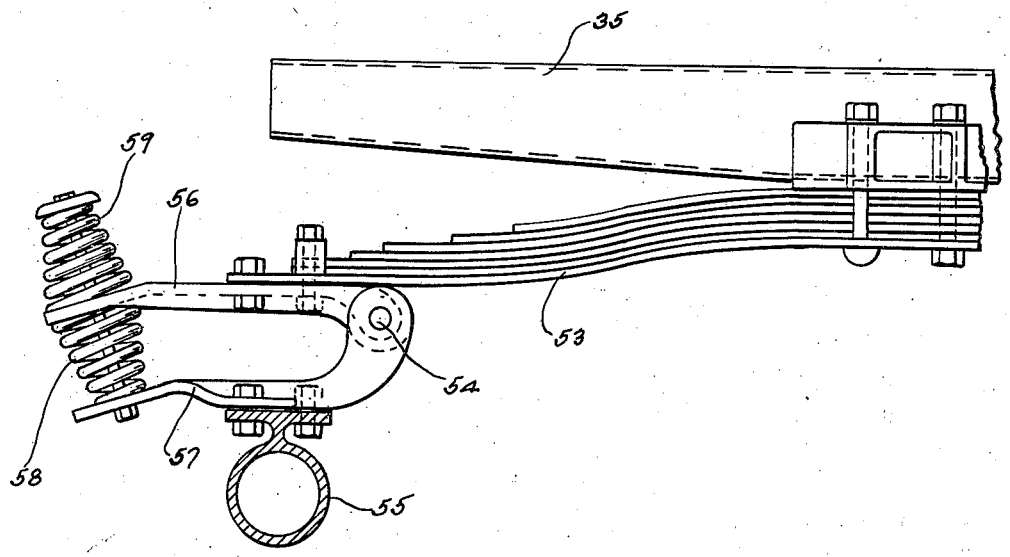
Figure 6 is a similar view of the rear portion of the automobile equipped with a further type of shock absorber very similar to that illustrated in Figure 5.

Figure 6 shows this type of shock absorber as applied to the rear cantilever spring 53. It is substantially like that shown in Figure 5 except that the pivot point 54 is located below the cantilever spring but in advance of the rear axle 55. The arms 56 and 57 of the upper and lower members respectively, may either be single or may be forked as described in connection with Figures 5, 7 and 8. As there are no interfering portions of the automobile structure they are preferably made single, the proportion of the springs 58 and 59 being such as to give adequate support in all cases. In the same manner as that described for the shock absorber shown in Figure 5, these springs 58 and 59 may be made of different strengths, that is to say, the main load carrying spring 58 may be heavier than the upper spring or snubber spring 59.

Figure 9:
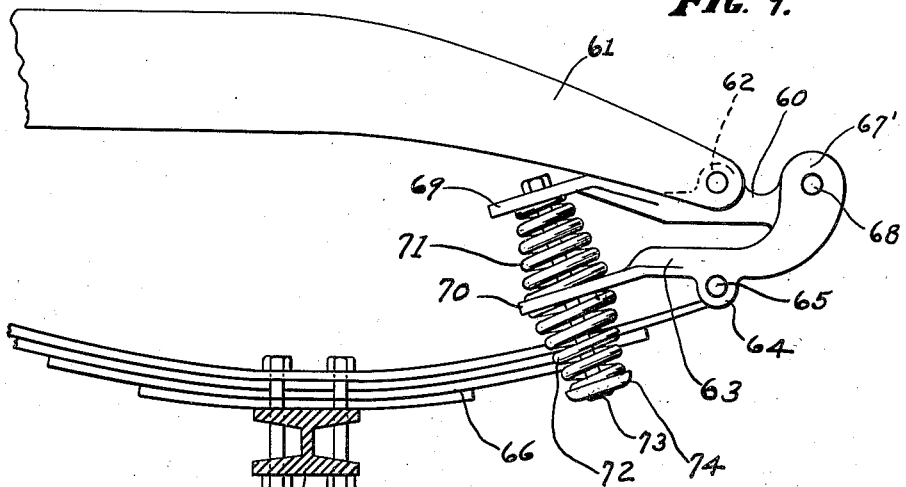
Figure 9 is a fragmentary view of the front portion of an automobile showing a further form of shock absorber in position thereon.

Figure 9 shows a further form of shock absorber in which the upper member 60 is secured by the shackle bolt to the side bar 61 of the automobile, a suitable perforated lug 62 being provided for such purpose. The lower member 63 is provided with a lug 64 which carries a pintle pin or bolt 65 to engage the eye of the spring 66, such latter spring having the front axle 67 secured thereto, in the usual manner. Each member is provided with a forwardly and upwardly extending portion 67' which may be constructed in the same manner as the lugs 40 and 41 (Figures 7 and 8) and a pivot bolt or pin 68 may join such member. These upper and lower members are respectively provided with the bearing plates or portions 69 and 70 constructed in a manner similarly to that described in connection with the bearing plates 44 and 48 (Figures 7 and 8). The upper and lower springs 71 and 72 are tied together by means of a tie bolt 73 in the same manner as the springs of the shock absorber shown in Figures 5 and 6, a suitable cap 74 being provided for the lower spring 72. In this construction the upper spring is the weight carrying or main spring and is heavier than the lower or snubber spring 72.

In all forms of the invention the members of the shock absorbers are pivotally joined at a point in front of and above the respective axles of the automobile. This construction allows a rearward and upward motion of the axles with reference to the body portion of the machine, thereby cushioning not only the upward component of the blow but also the longitudinal component. In each case a relatively heavy spring is provided, as the main load carrying spring of the shock absorber and a relatively lighter spring, as the snubber spring, such spring, of course, functioning to cushion the rebounds. By forming these springs of different strength either by using different sizes of wire or different designs, it is possible to provide a non-periodic compound spring, that is to say, inasmuch as the springs have different natural periods they will tend to damp out periodic vibrations in a rapid and effectual manner.

A further important result secured by this invention is the provision of a shock absorber thru which the driving force is transmitted to the body and framework of the machine. The advantages of this construction are apparent as it cushions the shocks incident to sudden stopping or starting and causes the automobile to start and stop in a smooth and uniform manner.

I claim:

1. A shock absorber for an automobile having a chassis and a main spring, said shock absorber comprising a member adapted to be secured to the chassis, a lever pivotally secured at one end to said member and adapted to be pivotally secured intermediate its ends to the main spring, a helical spring upon each side of said lever and engaged therewith, the spring upon one side of said lever being secured to said member and the spring upon the other side of said lever being engaged with said main spring.

2. The combination with an automobile having a chassis and a main spring, of a lever pivotally carried at one end by the chassis and pivotally secured intermediate its ends to said main spring, and resilient means secured to said chassis and main spring and engaged with the other end of said lever.

3. A shock absorber for an automobile having a chassis and a main spring, said shock absorber comprising a member adapted to be secured to the chassis and constituting an extension thereof, a lever pivotally connected at one end with said member, connecting means below said pivotal connection and intermediate the ends of said lever for hingedly joining the lever to the main spring, a spring having one end secured to said member and the other end in engagement with the lever, a second spring upon the other side of the lever, means for maintaining the spring in resilient engagement with the lever, and means for retaining the springs in position upon the lever.

COLIN B. DALE.